UNITED STATES PATENT OFFICE.

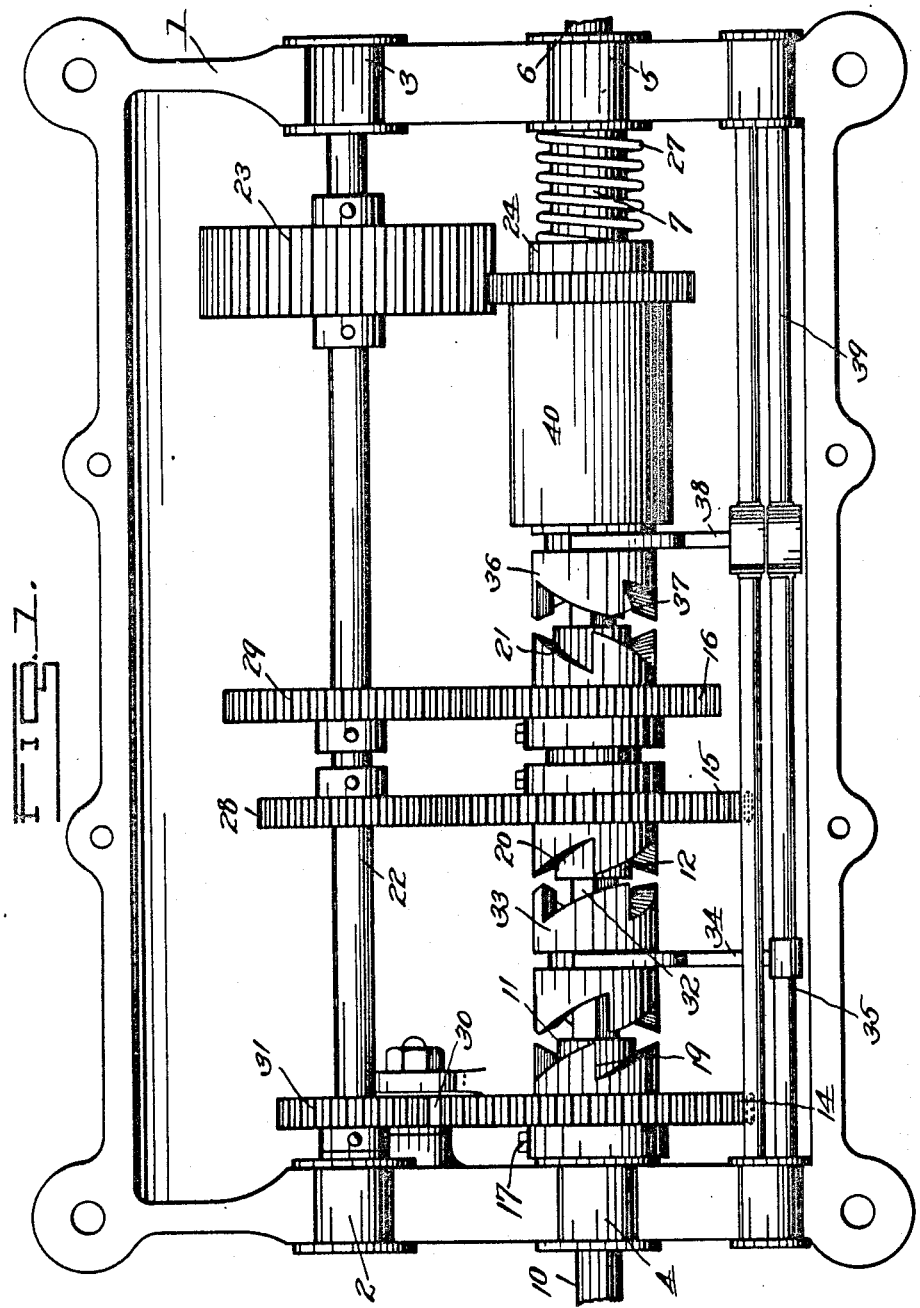

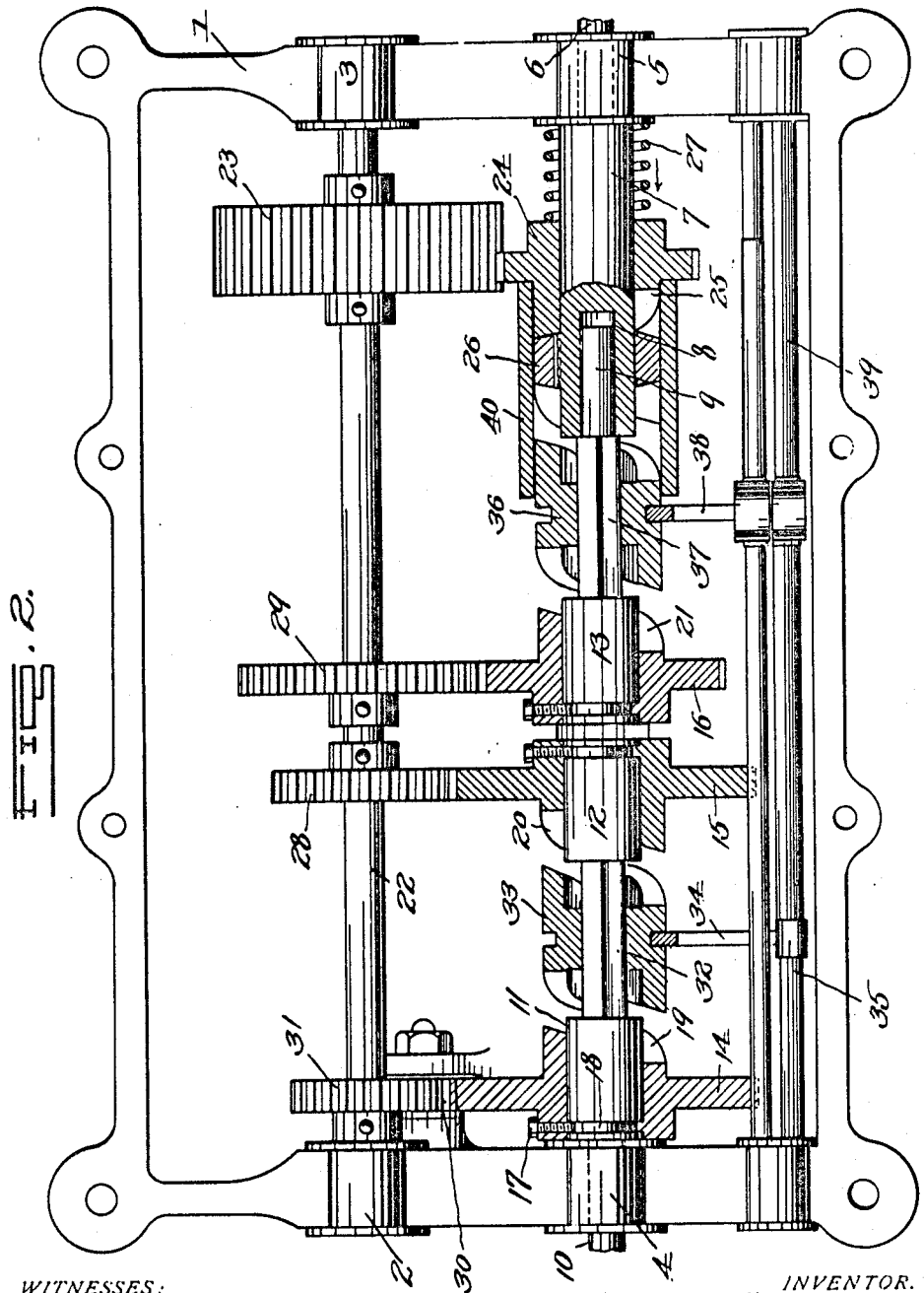

HENRY L. SCHENCK, OF DECATUR, ILLINOIS, ASSIGNOR OF ONE-FOURTH TO HOWARD M. ONYETT, OF DECATUR, ILLINOIS, AND ONE-FOURTH TO THOMAS J. DRAPER, OF MOUNT ZION, ILLINOIS.

CHANGEABLE-SPEED-GEAR MECHANISM.

1,094,751.  Specification of Letters Patent.  Patented Apr. 28, 1914.

Application filed May 2, 1912.  Serial No. 694,639.

*To all whom it may concern:*

Be it known that I, HENRY L. SCHENCK, a citizen of the United States of America, residing at Decatur, in the county of Macon and State of Illinois, have invented certain new and useful Improvements in Changeable-Speed-Gear Mechanism, of which the following is a specification.

This invention relates to certain new and useful improvements in changeable speed-gear transmission mechanism, the object being to provide mechanism for changing the speed of the engine in which the mechanism is used in connection, without shifting the gears, thereby reducing the wear and providing a noiseless transmission.

A further object of the invention is to provide a transmission gear so constructed that the gears are always in mesh, whereby any one of the gears can be brought into operative position so that the operator can instantaneously select any one of the gears in order to obtain the desired speed or reverse.

A still further object of the invention is to provide a mechanism which is so constructed that direct drive through the center of all gears can be obtained with all the gears in mesh.

Other and further objects and advantages of the invention will be hereinafter set forth and the novel features thereof defined by the appended claims.

In the drawings—Figure 1, is an elevation of my improved transmission gearing, one side of the casing being removed in order to show the mechanism; and Fig. 2, is a similar view showing the mechanism in section.

In the drawing 1 indicates a casing which may be formed of any design or configuration, but herein shown rectangular in shape, having bearings 2, 3, 4 and 5 at its opposite ends, which may be roll or ball as desired. Mounted within the bearing 5 is a driving shaft 6 having an enlarged portion 7; the end thereof being provided with a longitudinal bore forming a tubular portion 8 in which the circular portion 9 of a driven shaft 10 is revolubly mounted, the opposite end of said shaft being mounted in the bearing 4. The driven shaft 10 is provided with enlarged circular portions 11, 12 and 13 on which are loosely mounted gear wheels 14, 15 and 16, said wheels being positioned thereon by set screws 17 traveling in annular grooves 18 formed in the enlarged portions of the driven shaft as clearly shown in Fig. 2. The gears 14, 15 and 16 are provided with hub portions having clutch members 19, 20 and 21; and the gear 14 forms a reverse gear; the gear 15 a low-speed gear; and the gear 16 an intermediate speed gear, as will be hereinafter fully described.

Mounted within the bearings 2 and 3 is a counter shaft 22 on which is fixed adjacent one end, a gear 23 which is driven by a pinion 24 loosely mounted on the enlarged portion 7 of the drive shaft 6; said pinion being provided with a clutch member 25 adapted to be normally held in operative engagement with a double clutch member 26 fixed on the drive shaft 6, as clearly shown in Fig. 2 by a coil spring 27 surrounding the enlarged portion, as clearly shown. The counter shaft 22 is provided with a gear 28 meshing with the low-speed gear 15 and a gear 29 meshing with the intermediate speed gear 16 which are always in mesh and it will be seen that when the gear 23 on the counter shaft 22 is driven by the pinion 24, the gears 15 and 16 will be driven in the same direction as the pinion 24. Meshing with the reverse gear 14 is an idle gear 30 which is driven by a gear 31 fixed on the counter shaft 22 in order to reverse the direction of rotation of the reverse gear.

For locking either of the reverse or low-speed gears to the driven shaft, I provide the latter with a reduced square portion 32 on which is slidably mounted a double clutch member 33 controlled by a shifting arm 34 arranged upon the shifting rod 35, and it will be seen that when the rod is shifted longitudinally in one direction, the clutch member 33 will be thrown into operative engagement with the low-speed gear 15 and when shifted in a reverse direction, will be thrown into operative engagement with the reverse gear 14.

In order to obtain a direct drive or high speed drive, I provide means for connecting the drive shaft 10 and the driven shaft 5 which comprises a double clutch member 36 arranged upon the square portion 37 of the driven shaft 10, and controlled by a shifting arm 38 mounted upon a shifting rod 39. Fixed on the double clutch member 36 is a sleeve 40 which extends over the double clutch member 26 and the clutch portion 25 of the pinion 24 and is adapted to move the pinion 24 longitudinally upon the shaft 6 against the action of the spring so as to throw the clutch portion out of engagement with the fixed clutch 26; and it will be seen that as this is thrown out of operative engagement the clutch 36 is thrown into operative engagement with the clutch 26, whereby the driving and driven shaft is connected so as to obtain a direct drive. By shifting the clutch 36 in an opposite direction, it will be thrown into engagement with the clutch portion 21 of the intermediate speed gear 16, so as to drive the driven shaft at an intermediate speed. In order to disconnect all the gears and clutches it is only necessary to move the clutch member 36 longitudinally upon the square portion 37 into such a position as to throw the clutch 25 of the pinion 24 out of mesh with the double clutch 26 without throwing the clutch 36 into engagement with the clutch 26 and the drive shaft will be allowed to rotate freely.

While I have shown and described a peculiar construction of clutch members, it will of course be understood that any form of clutch can be used and that the manner of mounting the same may be varied without departing from the spirit of my invention.

The operation of the mechanism is as follows: Supposing that the gears are in the position as shown in the drawing, the driving shaft will drive the pinion 24 which in turn drives the gear 23 of the counter shaft, causing the gears carried thereby, to revolve the reverse gear, low-speed gear and intermediate speed gear carried by the driven shaft. By operating the clutch member 33 in one direction the low-speed gear will be thrown into operation and by operating the clutch in a reverse direction, the reverse gear will be thrown into operation. By operating the clutch member 36 so as to move toward the pinion, the pinion will be moved longitudinally upon the drive shaft, and in order to provide means for preventing the pinion from being thrown out of mesh with the gear 23, the width of the gear 23 is three times as great as the pinion, which is sufficient to allow the pinion to move the desired distance so that the clutch 36 will be thrown into operative engagement with the clutch 26 so as to unite the driven and drive shafts, in order to obtain the high speed. When the clutch 36 is shifted in an opposite direction, it is thrown into operative engagement with the intermediate speed gear, causing the driven shaft to rotate, and as shown in the drawing, the gears carried by the counter shaft are of different sizes in order to obtain the desired speed.

It will be seen that I have provided a selective speed changing gearing in which any of the speed gears can be thrown into and out of operation without throwing the gears out of mesh. I have also provided means for obtaining a direct drive through the center of all gears when at high speed.

I claim:

1. In a change speed mechanism, a driven shaft, a double clutch member feathered upon said driven shaft, a counter shaft, a gear carried by said counter shaft, a driving shaft arranged in longitudinal alinement with the driven shaft, a double clutch member fixed on said driving shaft, a pinion loosely mounted upon said driving shaft meshing with the gear of the counter shaft and provided with a clutch face, a spring normally holding the clutch face in engagement with the coöperating double clutch member of the driving shaft, a sleeve carried by the double clutch member of the driven shaft engaging said pinion, meshing gears carried by the driven and counter shafts, the gear of the driven shaft being provided with a clutch face coacting with one of the faces of the feathered double clutch member of the driven shaft, and means for shifting the feathered double clutch member for connecting the clutches of the driven and driving shafts and simultaneously disconnecting the pinion from the clutch member of the driving shaft.

2. In a speed change mechanism, the combination with a driving shaft having a bore at one end, a driven shaft arranged in longitudinal alinement with the driving shaft having a reduced portion extending into said bore, a clutch member mounted to move longitudinally upon said driven shaft, a double clutch member fixed upon said driving shaft, a pinion having a co-acting clutch face loosely mounted upon said driving shaft, a spring for normally holding said clutch face of the pinion in engagement with one of the clutch faces of the double clutch member of the driving shaft, a counter shaft, a gear carried by said counter shaft meshing with the pinion, meshing gears carried by the counter shaft and driven shaft, a sleeve carried by the clutch member of the driven shaft surrounding the double clutch member of the driving shaft and co-acting with the pinion thereof for simultaneously disconnecting the pinion from the fixed clutch member and connecting the clutch member of the driven and driving shafts.

3. In a speed change mechanism, the combination with a driven shaft, of a counter shaft, meshing gears carried by the respective shafts, a driving shaft arranged in longitudinal alinement with the driven shaft, a double clutch member fixed on the driving shaft, a pinion slidably mounted upon said driving shaft having a clutch face, a coil spring surrounding said driving shaft for holding said clutch face in engagement with the clutch member of said driving shaft, a gear carried by the counter shaft of a greater width than the pinion, a clutch member mounted to slide upon said driven shaft, a sleeve carried by said clutch member surrounding the clutch member of the driving shaft and co-acting with the pinion for simultaneously throwing said pinion out of contact with the clutch member and connecting the clutch faces of the clutch members of the driving and driven shafts.

In testimony whereof I affix my signature in presence of two witnesses.

HENRY L. SCHENCK.

Witnesses:
   Jos. E. BRAMBLETT,
   U. G. GILE.

---

Copies of this patent may be obtained for five cents each, by addressing the "Commissioner of Patents, Washington, D. C."